US009489683B2

(12) United States Patent
Parker

(10) Patent No.: US 9,489,683 B2
(45) Date of Patent: Nov. 8, 2016

(54) GENERATING AND USING NETWORK DATA TO PROVIDE A CONTENT CUSTOMIZATION SERVICE

(71) Applicant: Verizon Patent and Licensing Inc., Basking Ridge, NJ (US)

(72) Inventor: Benjamin J. Parker, Vacaville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 602 days.

(21) Appl. No.: 14/059,024

(22) Filed: Oct. 21, 2013

(65) Prior Publication Data

US 2014/0046771 A1   Feb. 13, 2014

Related U.S. Application Data

(62) Division of application No. 13/072,891, filed on Mar. 28, 2011, now Pat. No. 8,566,245.

(51) Int. Cl.
| G06F 21/00 | (2013.01) |
| G06Q 30/02 | (2012.01) |
| H04W 4/02 | (2009.01) |
| H04W 4/20 | (2009.01) |

(52) U.S. Cl.
CPC .......... *G06Q 30/0267* (2013.01); *G06Q 30/02* (2013.01); *H04W 4/028* (2013.01); *H04W 4/206* (2013.01)

(58) Field of Classification Search
USPC ........... 705/16, 21, 59, 71; 380/44, 278, 279
See application file for complete search history.

(56) References Cited

U.S. PATENT DOCUMENTS

| 2004/0252832 | A1 | 12/2004 | Domjan et al. |
| 2008/0021834 | A1* | 1/2008 | Holla .................... G06F 19/322 705/51 |
| 2009/0149246 | A1* | 6/2009 | Opaluch ................ A63F 13/79 463/29 |

* cited by examiner

*Primary Examiner* — Dante Ravetti

(57) ABSTRACT

A system is configured to receive a request for a customization packet associated with a user device; retrieve data associated with the device; encode portions of the network data using a group of keys, wherein each portion is encoded using a different one of the keys, and wherein each key corresponds to a different set of fields, of one or more sets of fields within the packet; store the encoded portions in the one or more sets of fields within the packet; and transmit, to a content provider, the packet, wherein the packet enables the content provider to decode all or a portion of the network data using one of the keys, and wherein all or the portion of the decoded network data enables the content provider to generate customized content for the device.

20 Claims, 9 Drawing Sheets

| STAGE 305 | RESOLUTION LEVEL 310 | PRICE 315 |
|---|---|---|
| STAGE 1 | RESOLUTION LEVEL 1 | PRICE LEVEL 1 |
| STAGE 2 | RESOLUTION LEVEL 2 | PRICE LEVEL 2 |
| STAGE 3 | RESOLUTION LEVEL 3 | PRICE LEVEL 3 |
| STAGE 4 | RESOLUTION LEVEL 4 | PRICE LEVEL 4 |

| STAGE 405 | LOCATION 410 | TIME AT LOCATION 415 | PREFERRED LOCATION 420 | GENDER 425 | AGE 430 |
|---|---|---|---|---|---|
| STAGE 1 | LOCATION CODE A | | | | |
| STAGE 2 | LOCATION CODE B | TIME CODE | | GENDER CODE | AGE CODE |
| STAGE 3 | LOCATION CODE C | | PREFLOC CODE | | |

| URL 455 | STAGE 1 CATEGORY 460 | STAGE 2 VISITS 465 | STAGE 3 TIME 470 |
|---|---|---|---|
| TOP LEVEL WEB PAGE | MAJCAT1 | VISIT 0 | TIME 0 |
| SUB-LEVEL 1 WEB PAGE | SUBCAT1 | VISIT 1 | TIME 1 |
| SUB-LEVEL 2 WEB PAGE | SUBCAT2 | VISIT 2 | TIME 2 |
| SUB-LEVEL 3 WEB PAGE | SUBCAT3 | VISIT 3 | TIME 3 |
| SUB-LEVEL 4 WEB PAGE | SUBCAT4 | VISIT 4 | TIME 4 |
| SUB-LEVEL 5 WEB PAGE | SUBCAT5 | VISIT 5 | TIME 5 |

| STAGE 1 605 | STAGE 2 610 | STAGE 3 615 |
|---|---|---|
| DEVICE CODE 622 | | |
| | AGE CODE 630 | |
| | GENDER CODE 632 | |
| | LANGUAGE CODE 634 | |
| LOCATION CODE 624 | LOCATION CODE 636 | LOCATION CODE 642 |
| | TIME AT LOCATION CODE 638 | |
| | | PREFERRED LOCATION CODE 644 |
| URL HISTORY CODE 626 / CATEGORY CODE 628 ⋮ | VISIT CODE 640 ⋮ | TIME CODE 646 ⋮ |
| STAGE 4 620 | | |
| COI URL HISTORY CODE 650 / COI CATEGORY CODE 652 ⋮ | COI VISIT CODE 654 ⋮ | COI TIME CODE 656 ⋮ |

| STAGE 1<br>605 | STAGE 2<br>610 | STAGE 3<br>615 | |
|---|---|---|---|
| DEVICE CODE<br>622 | | | |
| | AGE CODE<br>630 | | |
| | GENDER CODE<br>632 | | |
| | LANGUAGE CODE<br>634 | | |
| LOCATION CODE<br>624 | LOCATION CODE<br>636 | LOCATION CODE<br>642 | |
| | TIME AT LOCATION CODE<br>638 | | |
| | | PREFERRED LOCATION CODE<br>644 | |
| TITLE HISTORY<br>662<br>⋮ | GENRE<br>664<br>⋮ | DATA RATE<br>666<br>⋮ | TOTAL TIME<br>668<br>⋮ |
| STAGE 4<br>620 | | | |
| COI TITLE HISTORY<br>670<br>⋮ | COI GENRE<br>672<br>⋮ | COI DATA RATE<br>674<br>⋮ | COI TOTAL TIME<br>676<br>⋮ |

FIG. 6B

GENERATING AND USING NETWORK DATA TO PROVIDE A CONTENT CUSTOMIZATION SERVICE

CROSS-REFERENCE TO RELATED APPLICATION

This application is a divisional of U.S. patent application Ser. No. 13/072,891 filed Mar. 28, 2011, the disclosure of which is hereby incorporated herein in its entirety.

BACKGROUND

Service provider networks transport network traffic associated with a variety of services, applications, and content. The network traffic may include voice, text, video and/or data. Service provider networks are sized and/or scaled in order to transport an increasing quantity of traffic that is sent by and/or received from an increasing number of users and/or content providers. Additionally, the increase in the quantity of traffic corresponds to an expanding demand for various types of services, applications, and/or content.

Unfortunately, content providers transport content, such as advertising, to user devices in a manner that is not always tailored to the user devices. Additionally, service provider networks are transporting an increasing amount of the content (e.g., at higher bandwidths, data rates, bulk quantities, etc.) to the user devices without charging the content providers a fee for network services provided by the service provider networks.

BRIEF DESCRIPTION OF THE DRAWINGS

FIG. 3 is a diagram of an example data structure, associated with a customization service, that identifies one or more stages of network data relative to levels of resolution with respect to the network data;

FIGS. 4A and 4B are diagrams of example data structures that store network data associated with a user device;

FIGS. 6A and 6B are diagrams of example data structures associated with customization packets to be used in a customization service;

DETAILED DESCRIPTION OF PREFERRED EMBODIMENTS

Figure 1:
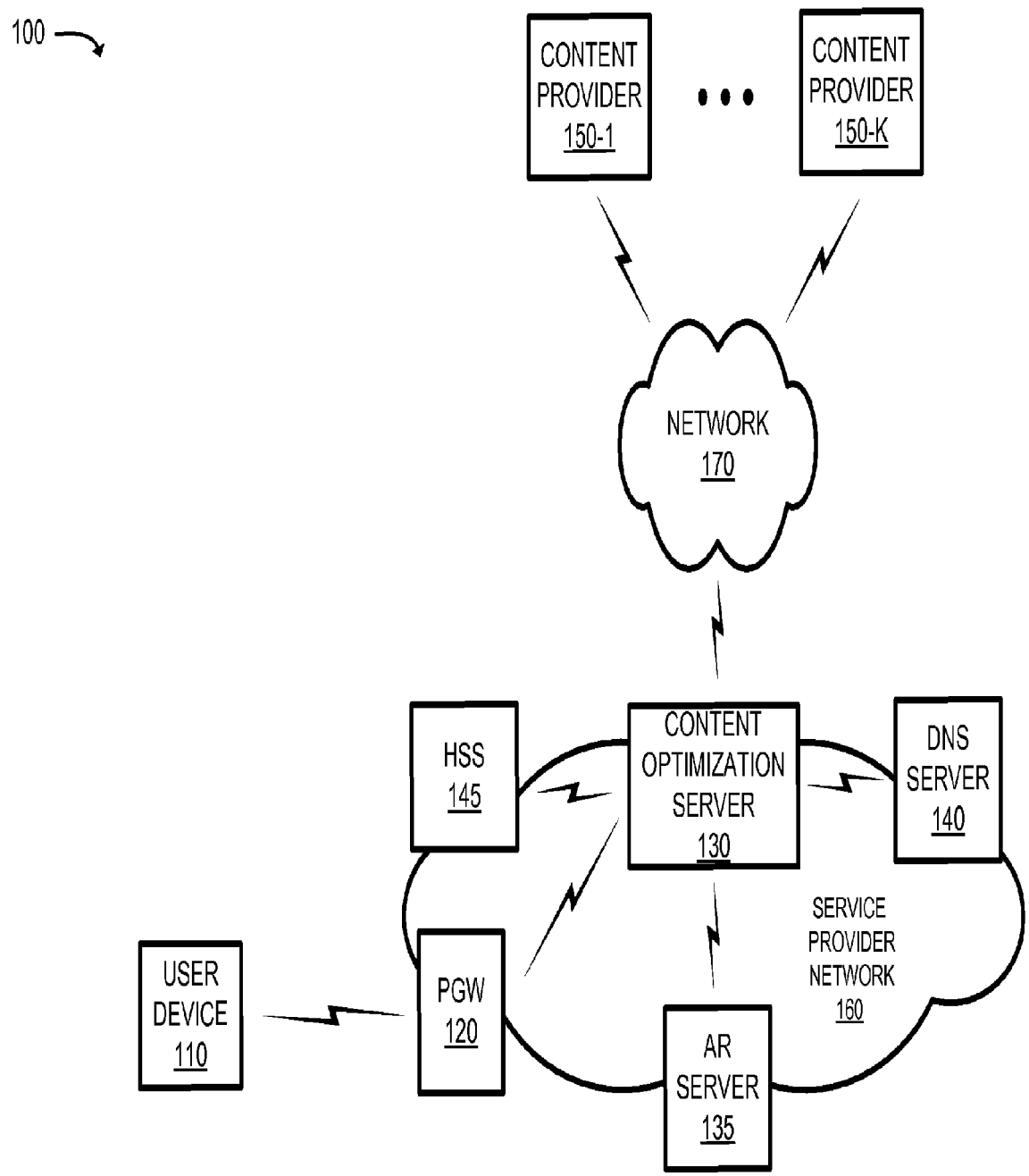
FIG. 1 is a diagram of an example environment in which systems and/or methods, described herein, may be implemented.

The following detailed description refers to the accompanying drawings. The same reference numbers in different drawings may identify the same or similar elements.

Systems and/or methods, described herein, may enable network data, associated with a user device, to be stored within a customization packet that, when decoded, permits a content provider to send customized content to the user device. The term "network data," as used herein, may include information associated with the user device (e.g., a device identifier, a device address, a port identifier, etc.); information associated with a user of the user device (e.g., a username, a password, information associated with an age, language, gender, etc.); context information associated with the user device (e.g., information associated with a location of the user device, a browsing history, preferred content, a call history, etc.); and/or information associated with a community of interest (COI) with respect to the user device (e.g., preferred content, preferred user devices with which the user device communicates, etc.).

As described herein, a server device, such as an analytical and reporting (AR) server, may encode the network data, associated with the user device, in a format that includes one or more stages. The AR server may store the encoded network data in a customization packet and/or data structure, within fields that correspond to the stages, and may send the customization packet and/or information, obtained from the data structure, to the content provider (e.g., usually for a fee and/or another form of consideration).

As also described herein, each field, within the customization packet, may include a respective portion of the network data, associated with the user device. The content provider may obtain a portion of the network data that corresponds to each stage for which access is authorized. Different portions of the network data may be encoded differently (e.g., based on a different key) based on a respective stage with which each of the different portions are associated. The encoding may permit the content provider to access one or more portions of the network data based on the stage for which a key has been obtained (e.g., for the fee and/or other form of consideration). The content provider may, for example, access all of the network data, associated with the user device, when a respective key for all of the stages has been obtained and/or purchased. The content provider may use the network data to customize content, such as advertising, movies, television content, sports, music, books, games, etc., for the user device. Customized content may be particular types of content that have been selected and/or tailored to the user device based on a location of the user device, usage habits of the user device (e.g., a call history, browsing history, purchasing habits, preferred content, etc.), information associated with a user of the user device, etc. A degree of customization to be performed on the content, to be sent to the user device, may be based on a quantity of network data accessible by the content provider.

As further described herein, a content optimization (CO) server may perform an operation that enables updated customization packets to be dynamically sent to a content provider in a timely manner. The CO server may, for example, identify a particular content provider from which content is to be obtained by the user device, based on a domain name service (DNS) query received from the user device. The CO server may communicate with the AR server to obtain an updated customization packet associated with the user device. The CO server may send the updated customization packet to the particular content provider and/or another content provider that, for example, renders advertising content via a web page associated with the particular content provider. The updated customization packet may enable the particular content provider to provide particular types of content to the user device. Additionally, or alternatively, the updated customization packet may enable the other content provider to display, in a timely manner, customized advertising content via the web page associated with the particular content provider.

FIG. 1 is a diagram of an example environment 100 in which systems and/or methods described herein may be implemented. As shown in FIG. 1, environment 100 may include a user device 110, a packet data network (PDN) gateway 120 (hereinafter referred to as a "PGW 120"), a content optimization (CO) server 130, an analytics and reporting (AR) server 135, a domain name service (DNS) server 140, a home subscriber server (HSS)/authentication, authorization, and accounting (AAA) server 145 (hereinafter referred to as a "HSS 145"), a group of content providers 150-1, . . . , 150-K (where K≥1) (hereinafter referred collectively as "content providers 150" and individually as "content provider 150"), a service provider network 160, and a network 170. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1.

Also, in some implementations, one or more of the devices of environment 100 may perform one or more functions described as being performed by another one or more of the devices of environment 100. For example, CO server 130 and AR server 135 may be combined into a single device. Devices and/or systems of environment 100 may interconnect via wired connections, wireless connections, or a combination of wired and wireless connections.

User device 110 may include any computation or communication device, such as a wireless mobile communication device that is capable of communicating with service provider network 160. For example, user device 110 may include a radiotelephone, a smart phone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a tablet computer, a camera, a personal gaming system, or another type of mobile computation or communication device.

PGW 120 may include one or more devices, or other types of computation or communication devices, that gather, process, search, store, and/or provide information in a manner similar to that described herein. PGW 120 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, PGW 120 may include a device that aggregates traffic received from one or more user devices 110 and may send the aggregated traffic to network 170. In another example implementation, PGW 120 may receive traffic from network 170 and may send the traffic to user device 110. PGW 120 may perform policing operations on traffic destined for service provider network 160.

CO server 130 may include one or more server devices that gather, process, search, store, and/or provide information in a manner similar to that described herein. In an example implementation, CO server 130 may perform operations associated with content distribution within environment 100. For example, CO server 130 may perform caching operations by obtaining content from content provider 150 and/or temporarily storing the content in a memory associated with CO server 130. CO server 130 may process content in order to ensure that the content is sent to user device 110. CO server 130 may, for example, convert content into a format and/or protocol based on a type of user device 110. CO server 130 may send the content, to user device 110 in a manner that maximizes network throughput without inducing congestion, jitter, and/or other conditions within service provider network 160.

In another example implementation, CO server 130 may perform operations to provide a content customization service to content provider 150 and/or user devices 110 that subscribes to service provider network 160. CO server 130 may obtain network data associated with user device 110. CO server 130 may, for example, obtain information associated with user device 110. In one example, CO server 130 may monitor traffic flows associated with user device 110 and may obtain, from network address translation (NAT) bindings associated with service provider network 160, information associated with user device 110. The information associated with user device 110 may include a device identifier (e.g., an MDN, etc.), a device address (e.g., an internal IP address and/or range of port identifiers (a port range) associated with the internal IP address, a public IP address, etc.). CO server 130 may send the information associated with user device 110 to AR server 135 to be used to generate a customization packet.

CO server 130 may monitor packets associated with traffic flows being transported to and/or from service provider network 160. CO server 130 may, for example, detect packets associated with a DNS query from user device 110. CO server 130 may identify a uniform resource locator (URL) associated with content provider 150 from the packets. CO server 130 may replicate the packets and may send a copy of the packets to AR server 135 to obtain an updated customization packet associated with user device 110. CO server 130 may forward the packets, associated with the DNS query, to DNS server 140. CO server 130 may forward the updated customization packet to content provider 150 and/or another content provider 150 (e.g., that renders advertising content on a web page associated with content provider 150) that enables content destined for user device 110 to be customized for user device 110.

AR server 135 may include one or more server devices, or other types of computation or communication devices, that gather, process, search, store, and/or provide information in a manner similar to that described herein. In one example implementation, AR server 135 may monitor traffic being sent to and/or received from service provider network 160 to obtain network data associated with user device 110. In another example implementation, AR server 135 may generate and/or update a customization packet, associated with user device 110, based on the network data.

For example, AR server 135 may monitor packets associated with traffic flows that are being transported to and/or from service provider network 160 to obtain network data associated with user device 110. AR server 135 may, in one example, obtain information associated with user habits of user device 110 to be included in a usage history associated with user device 110. AR server 135 may, for example, obtain information associated with a time (e.g., total time, peak time, average time, etc. per second, day, week, etc.) and/or at what cost (e.g., based on minutes used and/or rate per minute, etc.) that a particular user device 110 communicates with content provider 150. AR server 135 may obtain information associated with a quantity of content that is downloaded (e.g., total quantity of bytes per second, week, month, etc.), a quantity of bandwidth used (e.g., total, peak, average, etc. per second, week, month, etc.), and/or a quantity of purchases made (e.g., total, average, etc. per day, week, month, etc.) as a result of communications with content provider 150.

AR server 135 may obtain information associated with content that is accessed and/or downloaded from content provider 150, which may include a method of download (e.g., via streaming media, progressive download, etc.), a type of content (e.g., movies, video, music, audio, games, documents, images, etc.), a genre associated with the content (e.g., sports, science fiction, news, etc.), etc. Based on the information associated with the content, AR server 135 may identify preferred content providers 150 (e.g., top one, top five, top 10, etc.), a preferred type of content, a preferred genre of content, etc. for user device 110. Additionally, or alternatively, AR server 135 may identify a quantity of content that user device 110 is likely to download, a type of product that user device 110 is likely to purchase, a likelihood that user device 110 may purchase the type of product, etc.

AR server 135 may obtain information associated with a call and/or message history, of user device 110, over a period of time. For example, AR server 135 may obtain information associated with messages (e.g. using a short message service (SMS) protocol, multi-media service (MMS) protocol, an instant message (IM) protocol, an email protocol, etc.). AR server may, in another example, obtain information associated with calls (e.g., based on a mobile switching center (MSC) call data record) placed by and/or to user device 110. AR server 135 may use the messages and/or calls to identify preferred user devices 110 (e.g., sometimes referred to as "friends") with which user device 110 communicates, a preferred method of communicating (e.g., SMS, MMS, calls, etc.), and/or information associated with a duration that a message exchange and/or call is likely to be.

AR server 135 may obtain context information associated with user device 110. AR server 135 may, for example, obtain location information associated with user device 110 over a prior period of time. For example, AR server 135 may obtain the location information from service provider network 160. In one example, AR server 135 may use an application programming interface (API) to obtain the location information. In another example, AR server 135 may send a query to user device 110 to obtain the location information. In yet another example, AR server 135 may obtain, from packets associated with the traffic monitoring, information associated with a cell via which user device 110 is communicating. AR server 135 may identify preferred locations associated with user device 110 (e.g., top five locations, top ten locations, etc.) based on a respective period of time that user device 110 is located at each preferred location. AR server 135 may identify a location at which user device 110 is located most often. AR server 135 may obtain a current location when generating and/or updating a customization packet. In another example, AR server 135 may communicate with HSS 145 to obtain information associated with a type of user device 110, an operating system being executed by user device, services for which user device 110 has subscribed, etc.

AR server 135 may obtain information associated with a user of user device 110. AR server 135 may, for example, communicate with HSS 145 to retrieve information associated with a user profile (e.g., a username, a password, a PIN, information associated with an age and/or gender of the user, information associated with preferred content genres, parental controls, preferred language, etc.) that corresponds to the user.

AR server 135 may identify a COI associated with user device 110 based on the traffic monitoring. For example, AR server 135 may, in a manner similar to that described above, obtain context information, associated with each preferred user device 110 (e.g., information associated with user habits, preferred content, preferred content providers 150, SMS messages, MMS messages, calls, etc. for each preferred user device 110). AR server 135 may identify the COI associated with user device 110 based on the context information associated with user device 110 and context information associated with the preferred user devices 110.

AR server 135 may use the network data, associated with user device 110, to generate a customization packet to be used to provide a customization service to content provider 150 and/or user device 110. AR server 135 may encode the network data and may store the encoded network data in a customization packet that is transmitted, by CO server 130, to content provider 150 that enables content provider 150 to decode and use all or a portion of the network data to customize content that is sent to user device 110. AR server 135 may send a key, used to encode the network data, to content provider 150, via CO server 130, that enables content provider 150 to decode the network data.

DNS server 140 may be a server device that manages, stores, and/or obtains one or more IP addresses that corresponds to content providers 150 from which user device 110 obtains content. DNS server 140 may handle DNS queries received from user device 110. DNS server 140 may receive, from user device 110 and via service provider network 160, a request for an IP address associated with particular content (e.g., based on a domain name, etc.) and DNS server 140 may retrieve an IP address, associated with a particular content provider 150, that corresponds to the domain name. DNS server 140 may send the IP address to user device 110 that enables user device 110 to obtain the content from particular content provider 150.

HSS 145 may include one or more server devices, or other types of computation or communication devices, that gather, process, search, store, and/or provide information in a manner similar to that described herein. For example, HSS 145 may manage and/or store, in a memory associated with HSS 145, information associated with a user profile that corresponds to user device 110. The information associated with the user profile may, in addition or as an alternative to that described above, include an access point name (APN) that is permitted and/or accessible by user device 110, rate information, minutes allowed, and/or other information. An APN may identify particular applications, services and/or data that are permitted for user device 110. HSS 145 may store information associated with preferences that were specified by user device 110, such as preferred content types (e.g., videos, movies, music, etc.), preferred content genres (e.g., horror, sports, country music, etc.), or patterns, parental controls (e.g., exclude content with a restricted (R) rating, etc.). Additionally, or alternatively, HSS 145 may authenticate user device 110 to service provider network 160 and/or determine whether user device 110 is authorized to use a particular service and/or access particular information.

Content providers 150 may include any type or form of content providers. For example, content providers 150 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., Youtube, Vimeo, Netflix, Hulu, Veoh, etc.) that stream content from websites and/or permit content to be downloaded (e.g., via progressive download, etc.). Content providers 150 may produce media streams (e.g., television broadcasts). A media stream may refer to a stream of content that includes video content (e.g., a video stream), audio content (e.g., an audio stream), and/or textual content (e.g., a textual stream).

Content provider 150 may communicate with CO server 130 to obtain a key to obtain encoded network data that is stored in a customization packet. Content provider 150 may use the key, that corresponds to all or a portion of the network data, to decode the network data stored in the customization packet. Content provider 150 may use the decoded network data to customize content that is to be transmitted to user device 110.

Service provider network 160 may include one or more wired and/or wireless networks via which user devices 110 communicate and/or receive content. For example, service provider network 160 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, service provider network 160 may include a wide area network (WAN), a metropolitan area network (MAN), an ad hoc network, an intranet, a fiber optic-based network, and/or a combination of these or other types of networks.

Network 170 may include one or more wired and/or wireless networks. For example, network 170 may include a cellular network, the PLMN, a 2G network, a 3G network, a 4G network (e.g., an LTE network), a 5G network, and/or another network. Additionally, or alternatively, network 170 may include a WAN, a MAN, a telephone network (e.g., the Public Switched Telephone Network (PSTN)), an ad hoc network, an intranet, the Internet, a fiber optic-based network, and/or a combination of these or other types of networks.

Figure 2:
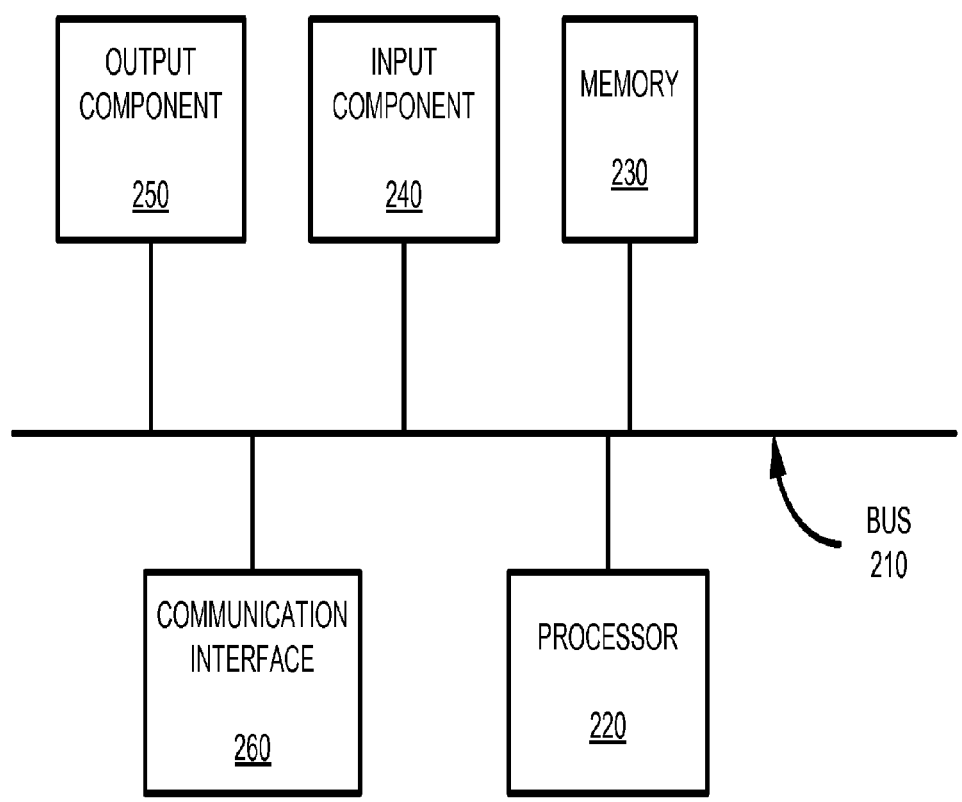
FIG. 2 is a diagram of example components of one or more of the devices of FIG. 1.

FIG. 2 is a diagram of example components of a device 200 that may correspond to user device 110, PGW 120, CO server 130, AR server 135, DNS server 140, and/or HSS 145. Alternatively, each of user device 110, PGW 120, CO server 130, AR server 135, DNS server 140, and/or HSS 145 may include one or more of device 200. Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as service provider network 160 and/or network 170. In one alternative implementation, communication interface 260 may be a logical component that includes input and output ports, input and output systems, and/or other input and output components that facilitate the transmission of data to other devices.

As will be described in detail below, device 200 may perform certain operations relating to providing a content customization service. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

FIG. 3 is a diagram of an example data structure 300 associated with a customization service (hereinafter referred to as "customization data structure 300") that identifies one or more stages of network data relative to levels of resolution with respect to the network data. Customization data structure 300 may include a collection of fields, such as a stage field 305, a resolution level field 310, and a price field 315. Customization data structure 300 includes fields 305-315 for explanatory purposes. In practice, customization data structure 300 may include additional fields, fewer fields, different fields, and/or differently arranged fields than are described with respect to customization data structure 300.

Stage field 305 may store information associated with a particular stage that corresponds to a portion of network data associated with user device 110. Resolution level field 310 may store information associated with a level of resolution that corresponds to the particular stage identified in stage field 305. The level of resolution may be associated with a degree of precision and/or accuracy associated with the network data. The level of resolution may increase in relation to a value associated with the particular stage. In one example, a resolution level associated with the particular stage may be lower than another resolution level associated with a stage with a value that is higher than the particular stage. In this example, the resolution level associated with a location of user device 110 may be associated with a quantity of error (e.g., +/−1 mile). The particular quantity of error may, for example, be greater than another quantity of error (e.g., +/−0.25 miles), associated with the location of user device 110, that corresponds to the other resolution level.

Price field 315 may store a price associated with network data that corresponds to the particular stage identified in stage field 305 and/or resolution level field 310. The price may be a value that is to be paid by content provider 150 to obtain access to the particular stage (e.g., by obtaining a key to the particular stage). Generally, the price may increase as the resolution level increases and/or a value associated with the stage increases.

Customization data structure 300 may store information associated with a stage (e.g., stage 1) that corresponds to a portion of network data associated with user device 110 (e.g., as shown by ellipse 320). The portion of the network data may correspond to a resolution level (e.g., resolution level 1) that pertains to a type of network data and/or a degree of precision and/or accuracy associated with the portion of network data (e.g., as shown by ellipse 320). The portion of the network data and/or the resolution level may correspond to a price and/or fee structure (e.g., price 1) to be paid by a content provider 150 to obtain a key that enables the portion of the network data to be decoded and/or accessed (e.g., as shown by ellipse 320).

Customization data structure 300 may store information associated with one or more other stages (e.g., stage 2, stage 3, stage 4, etc.) that corresponds to other portions of network data associated with user device 110 (e.g., as shown by ellipse 325). Each of the other portions of the network data may correspond to a respective resolution level (e.g., resolution level 2, resolution level 3, resolution level 4, etc. as shown by ellipse 325). The respective resolution level may pertain to another type of network data and/or another degree of precision and/or accuracy associated with each of the other portions of network data. Each of the other portions of the network data and/or the respective resolution level may correspond to a respective price and/or fee structure (e.g., price 2, price 3, price 4, etc. as shown by ellipse 325).

FIG. 4A is a diagram of an example data structure 400 that stores network data associated with user device 100 (hereinafter referred to as a "network data structure 400"). Network data structure 400 may include a collection of fields, such as a stage field 405, a location field 410, a time at location field 415, a preferred location field 420, a gender field 425, and an age field 430. Network data structure 400 includes fields 405-430 for explanatory purposes. In practice, network data structure 400 may include additional fields, fewer fields, different fields, and/or differently arranged fields than are described with respect to network data structure 400.

Stage field 405 may store information associated with a particular stage to which a portion of network data, associated with user device 110, corresponds. Location field 410 may store information associated with a location of user device 110. The information associated with the location of user device 110 may be associated with a particular degree of accuracy (e.g., a resolution level) that may, for example, increase as a value associated with the particular stage increases. The information associated with the location user device 110 may used only to an extent that a user, of user device 110, has authorized the use of the information, associated with the location of user device 110. Time at location field 415 may store information associated with a period of time during which user device is located at the location identified in location field 410. The information associated with the period of time may be associated with a particular stage, which may be accessed by content provider 150 only when authorized to access the particular stage. The period of time may be an average time, a period within a day (e.g., working hours, evening hours, etc.), a day of the week, and/or some other period of time (e.g. peak period of time, etc.) during which user device 110 spends at the location.

Preferred location field 420 may store information associated with a preferred location, such as a location where user device 110 is most often located during a time period (e.g., on a per day, week, month, season, year etc. basis). The information associated with the preferred location may be associated with a particular stage, which may be accessed by content provider 150 only when authorized to access the particular stage.

Gender field 425 may store information associated with a gender of a user of user device 110 (e.g., male, female, unknown, etc.). The information associated with the gender may be associated with a particular stage, which may be accessed by content provider 150 when authorized to access the particular stage. Age field 430 may store information associated with an age and/or age range (e.g., under 12 years old, 13 to 17, 18 to 24, etc.) of the user. The information associated with the age and/or the age range may be associated with a particular stage, which may be accessed by content provider 150 when authorized to access the particular stage.

In an example implementation, one or more portions of the network data, stored in fields 405 through 430 of network data structure 400, may be processed by AR server 135. When processing the network data, AR server 135 may, for example, encode each portion of the network data based on a respective stage to which each portion corresponds. AR server 135 may perform the encoding using a hash function (e.g., Fowler-Noll-Vo (FNV-1a) hash function), a cryptographic function, and/or some other mathematical function. The encoding for each stage may be performed based on a respective different key and/or may be decoded using the respective different key and/or another key.

AR server 135 may store and/or process information associated with a location of user device 110 based on a stage with which the information is associated. For example, for stage 1 (e.g., as shown by ellipse 432), AR server 135 may process and/or store the information associated with the location of user device 110 (e.g., location code A, as shown by ellipse 434) that corresponds to a stage 1 level of resolution (e.g., +/−2.4 km).

For stage two, AR server 135 may, for example, process and/or store the information associated with the location of user device 110 (e.g., location code B, as shown by ellipse 434) that corresponds to a stage 2 level of resolution (e.g., +/−0.61 km). The stage two level of resolution may be higher (e.g., more precise) than the stage one level of resolution. For stage three, AR server 135 may process and/or store the information associated with the location of user device 110 (e.g., location code C, as shown by ellipse 434) that corresponds to a stage three level of resolution (e.g., +/−0.076 km). The stage three level of resolution may be higher than the stage two level of resolution.

AR server 135 may obtain information associated with a quantity of time that user device 110 is likely to be located at a particular location and/or a preferred location from context information associated with user device 110. AR server 135 may process and/or store the quantity of time (e.g., time code, as shown by ellipse 436) in a manner that corresponds to a stage (e.g., stage 2, as shown by ellipse 432). AR server 135 may process and/or store information associated with the preferred location (e.g., preferred location (prefloc) code, as shown by ellipse 436) in a manner that corresponds to another stage (e.g., stage 3, as shown by ellipse 432).

AR server 135 may obtain information associated a gender and/or an age of a user of user device 110 from information associated with a user profile that was obtained from HSS 145. AR server 135 may process and/or store the information associated with the gender (e.g., gender code, as shown by ellipse 438) and/or the information associated with the age (e.g., age code, as shown by ellipse 438) in a manner that corresponds to a stage (e.g., stage 2, as shown by ellipse 432). The information associated with the age may be stored as an age range that corresponds to the age of the user.

A portion of the network data that corresponds to stage 1 may be processed (e.g., using the hash function, the cryptographic function, and/or the other mathematical function) based on a stage one key, prior to being stored in network data structure 400. The other portions of the network data that correspond to other stages (e.g., stage 2, stage 3, etc.) may be processed based on respective keys associated with the other stages.

FIG. 4B is a diagram of an example data structure 450 that stores network data that corresponds to a usage history associated with user device 100 (hereinafter referred to as a "history data structure 400"). History data structure 450 may include a collection of fields, such as a uniform resource locator (URL) field 455, a stage 1 category field 460, a stage 2 visits field 465, and a stage 3 time field 470. History data structure 450 includes fields 455-470 for explanatory purposes. In practice, history data structure 450 may include additional fields, fewer fields, different fields, and/or differently arranged fields than are described with respect to history data structure 450.

URL field 455 may store a particular URL that was visited by user device 110 within a period of time (e.g., one day, seven days, 14 days, 30 days, etc.). For example, a URL that corresponds to a top level web page (e.g., a home page of a website) may be stored in URL field 455. In another example, another URL that corresponds to a sublevel web page associated with the website (e.g., that is accessed via the top level web page or another sublevel web page associated with the website), may be stored in URL field 455.

Stage 1 category field 460 may store information associated with a major category and/or a subcategory of a web page that corresponds to the particular URL identified in URL field 455. For example, information associated with a major category that corresponds to a top level webpage may be stored in stage 1 category field 460. The major category may correspond to a type of subject matter (e.g., automobiles, etc.) and/or content genre (e.g., advertising, etc.) associated with the top level web page. In another example, information associated with a subcategory that corresponds to a sublevel web page may be stored in stage 1 category 460. The subcategory may correspond to particular subject matter (e.g., a particular make of automobile) that is associated with the type of subject matter and/or a particular content genre (e.g., automobile advertising, etc.) associated with the content genre.

Stage 2 visits field 465 may store information associated with a quantity of visits to a website, that corresponds to the particular URL, by user device 110. The quantity of visits may, for example, include a total quantity of visits to the top level web page and/or one or more sublevel web pages associated with the website. Stage 3 time field 470 may store information associated with a quantity of time that user device 110 visited the website. The quantity of time may, for example, include a total quantity of time that user device 110 spent visiting the top level web page and/or the one or more sublevel web pages associated with the website.

AR server 135 may obtain information associated with a usage history of user device 110 based on monitoring traffic associated with user device 110. AR server 135 may obtain from the information associated with the usage history, preferred websites visited by user device 110 over a period of time (e.g., a previous day, week, month, etc.). AR server 135 may process and/or store a URL associated with a preferred website. For example, AR server 135 may process and/or store a URL (e.g., top level webpage) associated with a home page of the preferred website (e.g., as shown by ellipse 472). AR server 135 may identify a major category associated with the home page and may store information associated with the major category (e.g., majcat1) in history data structure 450 (e.g., as shown by ellipse 472). AR server 135 may identify a quantity of times that user device 110 accessed the home page and may process and/or store a value (e.g., visit 0) that corresponds to the quantity of times user device 110 accessed the home page (e.g., as shown by ellipse 472). AR server 135 may identify a quantity of time that user device 110 accessed the home page and may process and/or store another value (e.g., time 0) that corresponds to the quantity of time that user device 110 accessed the home page.

AR server 135 may process and/or store another URL (e.g., sub-level 1 webpage) associated with a sublevel web page that is accessed via the home page within the preferred website (e.g., as shown by ellipse 474). AR server 135 may identify a subcategory associated with the sublevel page and may process and/or store information associated with the subcategory (e.g., subcat1) in history data structure 450 (e.g., as shown by ellipse 474). AR server 135 may identify a quantity of times that user device 110 accessed the sublevel web page and may process and/or store a value (e.g., visit 1) that corresponds to the quantity of times that user device 110 accessed the sublevel web page (e.g., as shown by ellipse 474). AR server 135 may identify a quantity of time that user device 110 accessed the sublevel page and may process and/or store another value (e.g., time 1) that corresponds to the quantity of time that user device 110 accessed the sublevel web page.

AR server 135 may process and/or store other information associated with the usage history that corresponds to other sublevel web pages (e.g., URLs associated with sublevel 2 webpage, sublevel 3 webpage, etc.) within the preferred website (e.g., as shown by ellipse 476). AR server 135 may store other information associated with the usage history that correspond to other preferred websites (e.g., top five preferred websites, top 10 preferred websites, etc.) over a period of time.

In an example implementation, one or more portions of the information associated with the usage history, stored in fields 455 through 470 of history data structure 450, may be encoded by AR server 135. For example, in a manner similar to that described above (e.g., with respect to FIG. 4A), each portion of the information associated with the usage history may be processed based on a respective stage to which each portion corresponds. For example, a portion of the information associated with the usage history that corresponds to stage 1 (e.g., the major category and/or one or more subcategories of the preferred website), may be encoded (e.g., using the hash function, the cryptographic function, and/or the other mathematical function) based on a stage one key, prior to being stored in history data structure 450. The other portions of the information associated with the usage history that correspond to other stages (e.g., stages 2, stage 3, etc.) may be encoded based on respective keys associated with the other stages.

Figure 5:
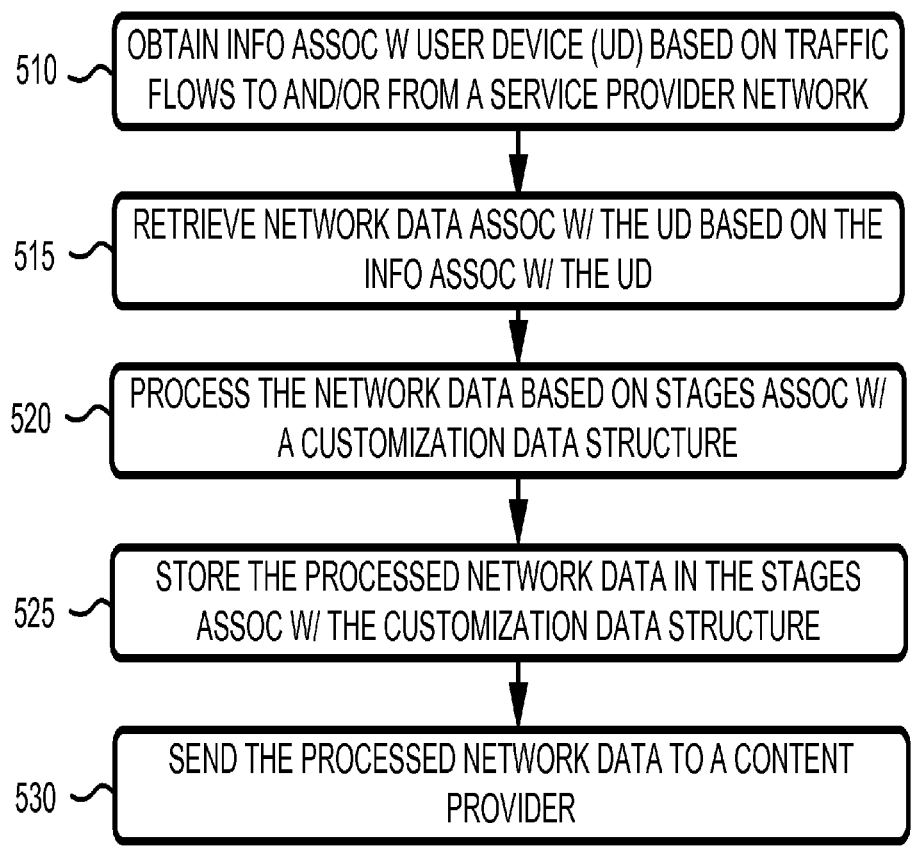
FIG. 5 is a flow chart of an example process for obtaining and/or processing network data associated with a user device.

FIG. 5 is a flow chart of an example process 500 for obtaining and/or processing network data associated with a user device 110. In one example implementation, process 500 may be performed by AR server 135. In another example implementation, some or all of process 500 may be performed by a device or collection of devices separate from, or in combination with, AR server 135.

As shown in FIG. 5, process 500 may include obtaining information associated with a user device from traffic flows to and/or from a service provider network (block 510). For example, CO server 130 may monitor packets associated with traffic flows to and/or from service provider network 160. CO server 130 may detect an IP address, associated with a traffic flow and may identify an internal IP address and/or port range, associated with service provider network 160, that corresponds to the IP address from NAT bindings stored in a memory associated with CO server 130. CO server 130 may use the internal IP address and/or port range to identify user device 110 (e.g., via an MDN associated with user device 110) to which the internal IP address and/or port range has been assigned. CO server 130 may transmit, to AR server 135, information associated with user device 110. The information associated with user device 110 may include address information (e.g., the internal IP address, port range, etc.) and/or a device identifier (e.g., the MDN, etc.). AR server 135 may receive the information associated with user device 110 and may inspect packets associated with traffic flows that correspond to user device 110.

As also shown in FIG. 5, process 500 may include retrieving network data associated with the user device based on the information associated with the user device (block 515). For example, AR server 135 may communicate with one or more devices, associated with service provider network 160, to obtain network data associated with user device 110.

For example, AR server 135 may communicate with service provider network 160 to obtain information associated with a location (hereinafter referred to as "location information") of user device 110. In one example, AR server 135 may use an API to obtain the location information. The location information may include information as described above in connection with FIG. 1. In an example implementation, AR server 135 may perform an operation to verify that a user of user device 110 has authorized the use of the location information prior to obtaining the location information.

AR server 135 may communicate with HSS 145 to obtain information associated with a user profile of the user of user device 110. The information associated with the user profile may include the information as described above in connection with FIG. 1. AR server 135 may retrieve, from a memory associated with AR server 135, information associated with a usage history and/or COI in connection with user device 110. The information associated with the usage history and/or COI may have been obtained from monitoring traffic flows, associated with user device 110, over a prior period of time. The information associated with the usage history and/or the COI may include information as described above in connection with FIG. 1.

As further shown in FIG. 5, process 500 may include processing the network data, associated with the user device, based on stages associated with a customization data structure (block 520). For example, AR server 135 may process one or more portions of the network data (e.g., the information associated with user device 110, information associated with the user, information associated with the usage history and/or COI, the context information, etc.) based on a respective stage with which each of the portions is assigned.

AR server 135 may perform stage one encoding on a portion of the network data, such as the information associated with the user device, the location information, and/or information associated with the usage history (e.g., top 10 URLs visited, previous 10 URLs visited, etc.). The encoding may be based on a hash function, a cryptographic hash function, and/or some other mathematical function using a key that is associated with stage one. AR server 135 may encode the information associated with user device 110 (e.g., an IP address and/or port range) to generate a device code (e.g., a string, a numeric value, and/or an alphanumeric value) of a predetermined length (e.g., a predetermined quantity of bytes). AR server 135 may, in a manner similar to that described above (e.g., with respect to FIG. 4A), encode the location information (e.g., a location at a particular level of resolution), based on a particular level of resolution, to generate a location code. AR server 135 may, in a manner similar to that described above (e.g., in connection with FIG. 4B), encode the information associated with the usage history of user device 110. The encoding of the information associated with the usage history may, for example, generate a URL code for each URL (e.g., top 10 URLs, previous 10 URLs visited, etc.) included in the usage history. The encoding of the information associated with the usage history may, in another example, generate a category code, for each URL (e.g. associated with a top level web page and/or one or more sublevel web pages) included in the usage history.

AR server 135 may perform stage two encoding on another portion of the network data, such as the information associated with a user of user device 110 (e.g., age, gender, language, etc.); the location information (e.g., the location at another level of resolution, a period of time associated with the location); and/or information associated with the usage history (e.g., quantity of visits to each of the preferred URLs). The encoding may be based on a hash function, a cryptographic hash function and/or some other mathematical function using a key that is associated with stage two. AR server 135 may, based on the stage two encoding, generate an age code that, when decoded, corresponds to an age or an age range of the user. AR server 135 may generate a gender code that, when decoded, corresponds to the age of the user. AR server 135 may generate a language code that, when decoded, corresponds to a language spoken by the user and/or used by user device 110. AR server 135 may generate a location code that, when decoded, identifies the location of the user device at the other level of resolution that is greater than the particular level of resolution. AR server 135 may generate a time code that, when decoded, identifies a period of time that user device 110 is likely to be at the location. AR server 135 may generate a visit code for each of the preferred URLs that, when decoded, identifies a respective quantity of times that user device 110 has visited each website associated with the preferred URLs.

AR server 135 may perform stage three encoding on a further portion of the network data, such as the location information (e.g., the location at a further level of resolution, a preferred location); and/or information associated with the usage history (e.g., a duration that user device 110 visits one or more URLs within a website). The encoding may be based on a hash function, a cryptographic hash function and/or some other mathematical function using a key that is associated with stage three. AR server 135 may, based on the stage three encoding, generate a location code that, when decoded, identifies the location of the user device at the further level of resolution that is greater than the other level of resolution. AR server 135 may generate a preferred location code that, when decoded, identifies a preferred location at which user device 110 is most often located. AR server 135 may generate a time code for each of the preferred URLs that, when decoded, identifies a respective period of time that user device 110 has visited each website associated with the preferred URLs.

AR server 135 may perform stage four encoding on another portion of the network data, such as the information associated with the COI in connection with user device 110. The encoding may be based on a hash function, a cryptographic hash function and/or some other mathematical function using a key that is associated with stage four. AR server 135 may perform the stage four encoding in a manner similar to that described above with respect to the encoding of the information associated with the usage history in stages one through stage three. Based on the stage four encoding, AR server 135 may, for example, generate a COI URL code for each COI URL included in the information associated with the COI and/or a COI category code for each of the COI URLs. AR server 135 may, in another example, generate a respective COI time code and/or a respective COI visit code for each of the COI URLs.

As yet further shown in FIG. 5, process 500 may include storing the processes network data based on the stages associated in the customization data structure (block 525) and sending the processed network data to a content provider (block 530). For example, AR server 135 may store the processed network data in a customization data structure. AR server 135 may, for example, store the encoded network data, associated with stage one encoding, in one or more entries of the data structure associated with stage one. AR server 135 may, in yet another example, store the encoded network data, associated with stage two encoding, stage three encoding, and/or stage four encoding, in a respective one or more entries, of the data structure, associated with stage two, stage three, and/or stage four, respectively.

AR server 135 may send the processed network data to content provider 150. In an example implementation, AR server 135 may store the processed network data in a customization packet that is configured in a manner similar to the customization data structure. AR server 135, may, for example, send the customization packet to content provider 150 via CO server 130. AR server 135 may determine to which stage, associated with the customization packet, content provider 150 is authorized to access (e.g., based on a service level agreement associated with content provider 150). AR server 135 and/or CO server 130 may transmit a key, that corresponds to the stage to which content provider 150 is determined to have access.

Content provider 150 may receive the key and may use the key to process network data that is stored in stages with which the key is associated. For example, if the key corresponds to stage one, then content provider 150 may decode the processed network data stored within stage one, but not in stages other than stage one. In another example, if the key corresponds to stage three, then content provider 150 may decode the processed network data stored within stage one, stage two, and/or stage three, but not in stages other than stages one, two and/or three. Content provider 150 may use the decoded network data to generate content that is customized for user device 110.

FIGS. 6A and 6B are diagrams of example data structure 600 and data structure 660, respectively, that store encoded network data associated with a customization service. Data structure 600 (hereinafter referred to as "customization data structure 600") may include a collection of fields, such as a stage 1 field 605, a stage 2 field 610, a stage 3 field 615, and a stage 4 field 620.

Stage 1 field 605 may store a portion of network data, associated with user device 110, that has been encoded based on stage one encoding (e.g., in a manner similar to that described above in connection with of FIG. 5). Stage 1 field 605 may include a device code entry 622, a location code entry 624, a URL history code entry 626, and a category code entry 628.

Device code entry 622 may store a device code, associated with user device 110. Location code entry 624 may store a location code, associated with user device 110. URL history code entry 626 may store a URL code, for each preferred URL identified in the usage history associated with user device 110. Category code entry 628 may store a category code, for each preferred URL, that was generated as a result of the stage one encoding. The device code, location code, URL codes, and/or category codes may have been generated as a result of stage one encoding in a manner similar to that described above (e.g., in connection with block 520 of FIG. 5).

Stage 2 field 610 may store another portion of network data, associated with user device 110, that has been encoded based on stage two encoding (e.g., in a manner similar to that described above in connection with FIG. 5). Stage 2 field 610 may include an age code entry 630, a gender code entry 632, a language code entry 634, a location code entry 636, a time at location code entry 638 and a visit code entry 640.

Age code entry 630 may store an age code associated with a user of user device 110. Gender code entry 632 may store a gender code associated with the user. Language code entry 634 may store a language code, associated with the user and/or user device 110. Location code entry 636 may store a location code, associated with user device 110, at another level of resolution. Time at location code entry 638 may store a time at location code associated with user device 110. Visit code entry 640 may store a visit code for each preferred URL identified in the usage history associated with user device 110. The age code, gender code, language code, location code, time at location code, and/or visit code may have been generated as a result of stage two encoding in a manner similar to that described above (e.g., in connection with block 520 of FIG. 5).

Stage 3 field 615 may store yet another portion of the network data, associated with user device 110, that has been encoded based on stage three encoding (e.g., in a manner similar to that described above in connection with FIG. 5). Stage 3 field 615 may include a location code entry 642, a preferred location code entry 644 and a time code entry 646.

Location code entry 642 may store a location code associated with user device 110 at another level of resolution. Preferred location code entry 644 may store a preferred location code associated with user device 110. Time code entry 646 may store a time code associated with a respective period of time that user device 110 accessed each preferred URL identified in the usage history. The location code, the preferred location code, and/or the time code may have been generated as a result of stage three encoding in a manner similar to that described above (e.g., in connection with block 520 of FIG. 5).

Stage 4 field 620 may store a further portion of the network data, associated with user device 110, that has been encoded based on stage four encoding (e.g., in a manner similar to that described above in connection with FIG. 5). Stage 4 field 620 may include a community of interest (COI) history code entry 650, a community of interest (COI)

category code entry 652, a community of interest (COI) visit code entry 654, and a community of interest (COI) time code entry 656.

COI history code entry 650 may store a COI URL code, for each preferred URL identified in the information associated with the COI in connection with user device 110. COI category code entry 652 may store a COI category code, for each preferred URL identified in the information associated with the COI. COI visit code entry 654 may store a COI visit code for each preferred URL identified in the information associated with the COI. COI time code entry 656 may store a COI time code that for each preferred URL identified in the information associated with the COI.

Data structure 660, of FIG. 6B, may store encoded network data for a particular type of content, such as video content. Although data structure 660 will be described below in a context associated with video content, in another example implementation, data structure 660 may be described in a context associated with a type of content that is different than video content (e.g., music, games, etc.). Data structure 660 may include one or more of the collection of fields 605-620 as described above in connection with customization data structure 600 of FIG. 6A.

Stage 1 field 605 may include one or more of the collection of entries 622 and 624 as described above with respect to FIG. 6A. Additionally, stage 1 field 605 may include a title history entry 662, and a genre entry 664. Title history entry 662 may store a respective title code that uniquely identifies each of selected video titles that are stored in the usage history associated with user device 110. The video titles may correspond to video content that is obtained (e.g., downloaded, streamed, etc.), by user device 110, most often (e.g., top five, top ten, etc.) based on the usage history of user device 110. Genre entry 664 may store a respective genre code that corresponds to each of the video titles. The title code and/or the genre code may have been generated as a result of stage one encoding in a manner similar to that described above (e.g., in connection with block 520 of FIG. 5).

Stage 2 field 610 may include one or more of the collection of entries 630 through 638 as described above with respect to FIG. 6A. Additionally, stage 2 field 610 may include a data rate field 666. Data rate field 666 may store a respective data rate code that corresponds to each of the video titles. The data rate code may be based on a data rate at which video content is to be streamed and/or transmitted to user device 110. The data rate may have been obtained from the information associated with the usage history of user device 110. The data rate code may have been generated as a result of stage two encoding in a manner similar to that described above (e.g., in connection with block 520 of FIG. 5).

Stage 3 field 615 may include one or more of the collection of entries 642 and 644 as described above with respect to FIG. 6A. Additionally, stage 3 field 615 may include a total time field 668. Total time field 668 may store a respective total time code that corresponds to each of the video titles. The total time code may be based on a period of time that video content was obtained (e.g., accessed, tuned to, recorded, downloaded, streamed, etc.) by user device 110. The period of time may have been obtained from the information associated with the usage history of user device 110. The total time code may have been generated as a result of stage three encoding in a manner similar to that described above (e.g., in connection with block 520 of FIG. 5).

Stage 4 field 620 may include a community of interest (COI) title history entry 670, a community of interest (COI) genre entry 672, a community of interest (COI) data rate entry 674, and a community of interest (COI) total time entry 676. COI title history entry 670 may store a respective title code for each video title identified in the information associated with the COI. COI genre entry 672 may store a respective genre code that corresponds to video content associated with the video titles. COI data rate field 674 may store a respective COI data rate code that corresponds to each of the video titles. COI total time entry 676 may store a respective COI total time code that corresponds to each of the video titles. The COI total time code may be based on a period of time that video content was obtained by user device 110 and/or other user devices 110 within the COI. The title code, the genre code, the data rate code, and/or the total time code may have been generated as a result of stage four encoding in a manner similar to that described above (e.g., in connection with block 520 of FIG. 5).

Data structures 600 and 660, of FIGS. 6A and 6B, respectively, include a number of fields and/or entries for explanatory purposes. In practice, data structures 600 and/or 660, of FIGS. 6A and/or 6B, respectively, may include additional fields and/or entries, fewer fields and/or entries, different fields and/or entries, and/or differently arranged fields and/or entries than are described with respect to data structures 600 and/or 660 of FIGS. 6A and/or 6B, respectively.

Figure 7:
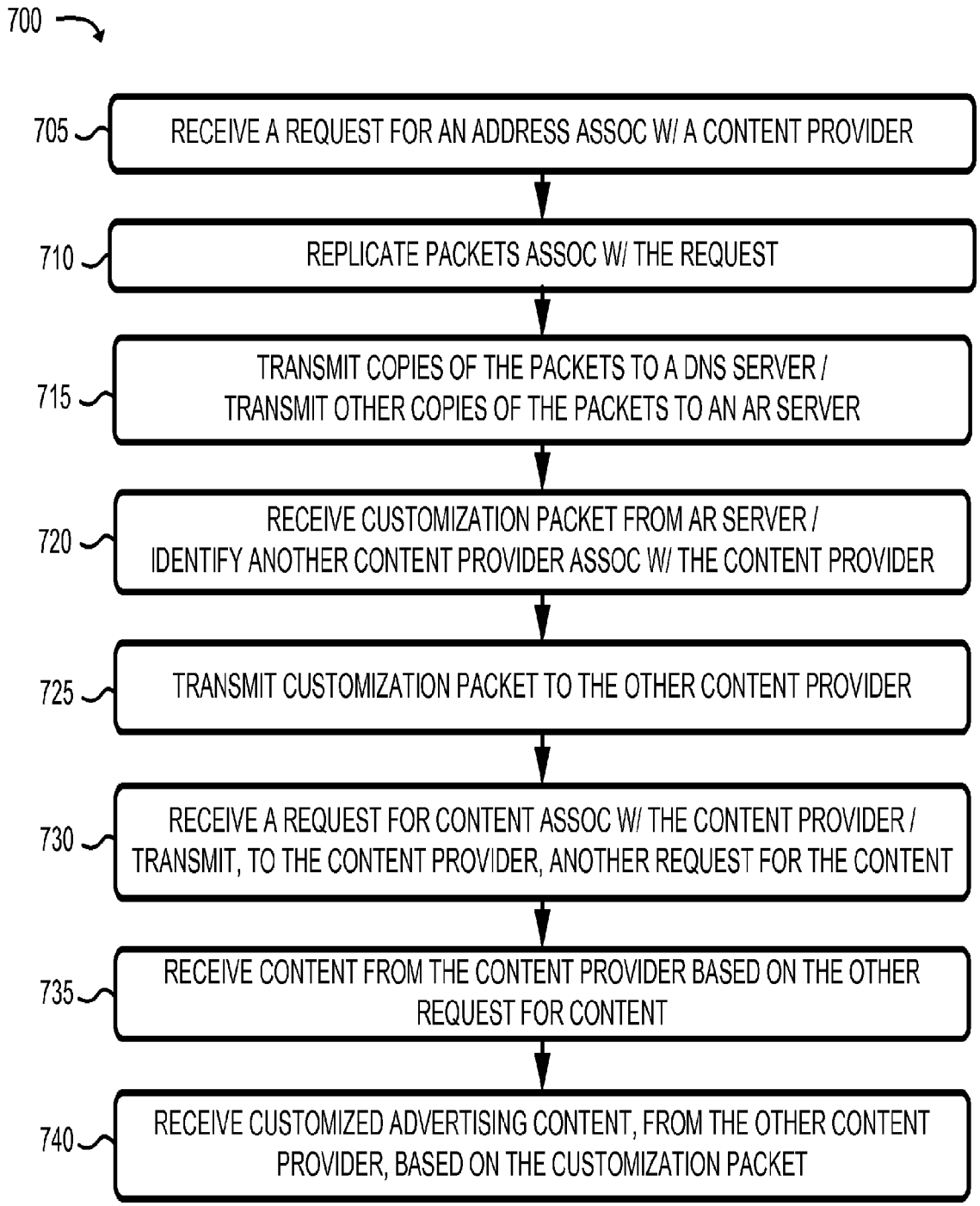
FIG. 7 is a flow chart of an example process for providing a customization service to a content provider based on a customization packet associated with a user device.

FIG. 7 is a flow chart of an example process 700 for providing a customization service to content provider 150 based on a customization packet associated with a user device 110. In one example implementation, process 700 may be performed by CO server 130. In another example implementation, some or all of process 700 may be performed by a device or collection of devices separate from, or in combination with, CO server 130.

Figure 8:
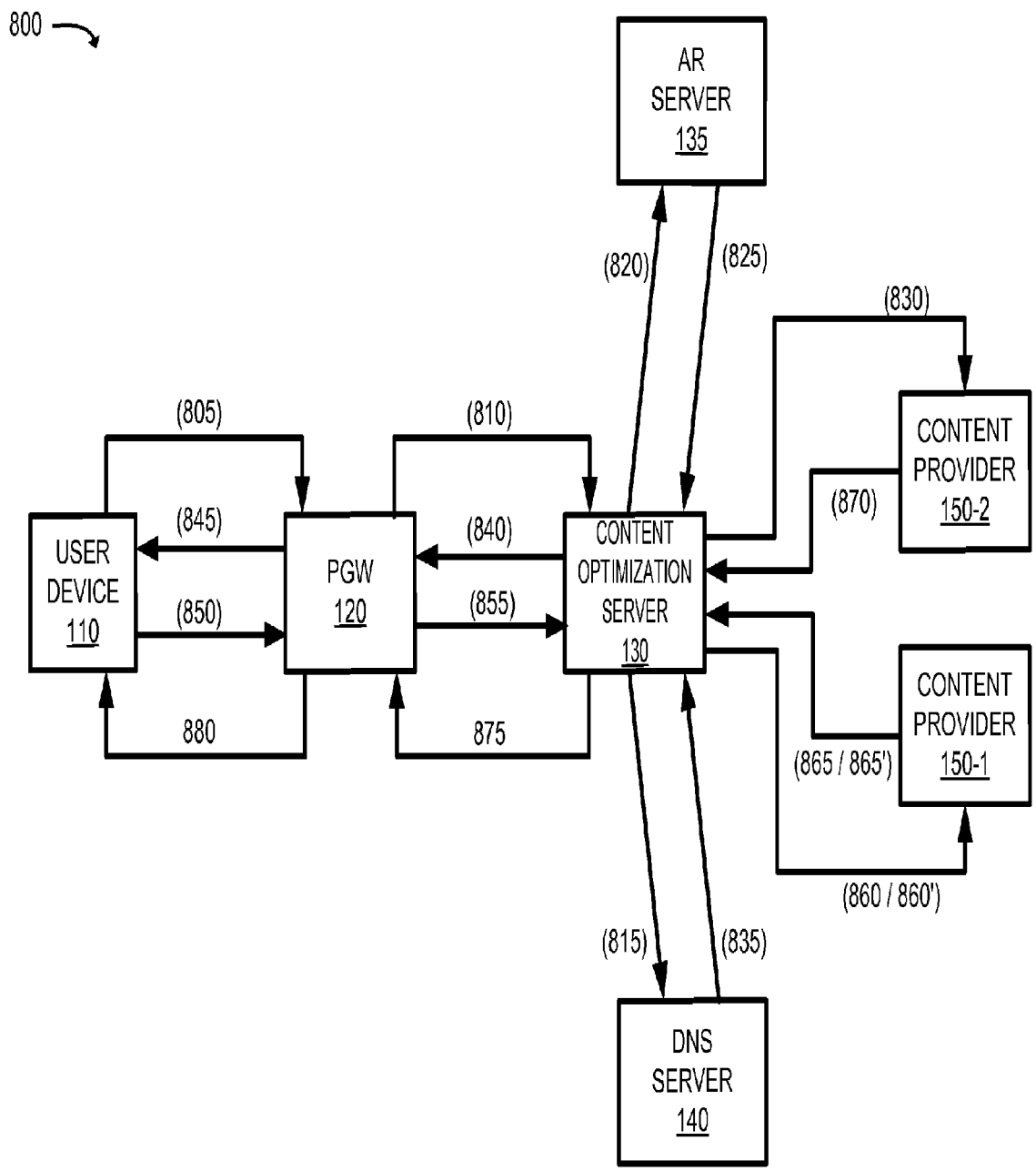
FIG. 8 is a diagram of example interactions between devices of an example portion of the environment of FIG. 1.

FIG. 8 is a diagram of example interactions between devices of an example portion 800 of environment 100. As illustrated in FIG. 8, example environment portion 800 may include user device 110, PGW 120, CO server 130, AR server 135, DNS server 140, and content providers 150-1 and 150-2. User device 110, PGW 120, CO server 130, AR server 135, DNS server 140, and content providers 150-1 and 150-2 may include the features described above in connection with FIG. 1 and/or FIG. 2. A portion of process 700 of FIG. 7 will be discussed below with corresponding references to the operations performed by example environment portion 800 of FIG. 8.

As shown in FIG. 7, process 700 may include receiving a request for an address associated with a content provider (block 705). For example, a user of user device 110 may desire to obtain content from content provider 150-1 and may instruct user device 110 to transmit a request for the content. User device 110 may, in response to the instruction, transmit a request for an address associated with content provider 150-1, as indication 805 (FIG. 8), to PGW 120. PGW 120 may receive the request and may transmit another request for the content, as indication 810 (FIG. 8) to CO server 130. CO server 130 may receive the other request from PGW 120. In one example implementation, the request and/or other request may be a DNS query (e.g., based on a URL associated with content provider 150-1).

As also shown in FIG. 7, process 700 may include replicating packets associated with the request (block 710) and transmitting a copy of the packets to an AR server and another copy of the packets to a DNS server (block 715). CO server 130 may generate copies of the packets associated with the other request. CO server 130 may, in a manner similar to that described above (e.g., in connection with block 510 of FIG. 5), identify an internal IP address and/or port range associated with user device 110 based on NAT bindings associated with user device 110. CO server 130 may retrieve, from a memory associated with CO server 130, information associated with user device 110 (e.g., a device identifier, such as a MDN) that is associated with the internal IP address and/or port range. CO server 130 may transmit the packets, as indication 815 (FIG. 8), to DNS server 140 and may transmit the copies of the packets, and/or the internal IP address, port range, and/or the information associated with user device 110, as indication 820 (FIG. 8), to AR server 135.

As further shown in FIG. 7, process 700 may include receiving a customization packet from the AR server and identifying another content provider that is associated with the content provider (block 720). For example, AR server 135 may receive the copies of the packets and may identify a URL associated with content provider 150-1 from the packets. AR server 135 may determine whether content provider 150-1 has subscribed to a customization service associated with service provider network 160 (e.g., based on a look-up operation using the URL). AR server 135 may generate or update a customization packet based on a determination that content provider 150-1 subscribes to the customization service. AR server 135 may not generate or update the customization packet based on a determination that content provider 150-1 does not subscribe to the customization service In another example implementation, AR server 135 may inspect the copies of the packets to determine whether a condition exists. For example, AR server 135 may detect a protocol error, a header error (e.g., associated with a transfer control protocol (TCP) header, a user datagram protocol (UDP) header, etc.), mis-ordered and/or dropped packets, malicious software (e.g., a virus, a worm, etc.), a potential electronic attack, etc. Based on a determination that a condition is associated with the copies of the packets, AR server 135 may send a notification to CO server 130 indicating that the condition has been detected. CO server 130 may receive the notification and may ignore the condition, may send a notification to user device 110 indicating that the condition has been detected, and/or may drop the packets and/or the copies of the packets associated with the request from user device 110.

AR server 135 may use the information, associated with user device 110, to retrieve a customization data structure (e.g., customization data structure 600 of FIG. 6A or data structure 660 of FIG. 6B), associated with user device 110, from a memory associated with AR server 135. In an example implementation, AR server 135 may store encoded network data obtained from the data structure in a customization packet associated with user device 110. In another example implementation, AR server 135 may retrieve updated network data associated with user device 110. For example, AR server 135 may communicate with service provider network 135 to obtain location information associated with user device 110. In another example, AR server 135 may query user device 110 to obtain the location information. In yet another example, AR server 135 may obtain, from traffic flows associated with user device 110, the location information (e.g., based on cell identifiers parsed from packet headers, etc.).

AR server 135 may obtain updated information associated with a usage history and/or COI, such as updated preferred content providers 150, preferred content (e.g., previous 10 URLs visited, top 5 genres, etc.), preferred user devices 110, etc.

AR server 135 may, in a manner similar to that described above in connection with FIG. 5, encode the updated network data. AR server 135 may store the updated network data (e.g., that has been encoded) and/or the encoded network data, obtained from the customization data structure, in a customization packet associated with user device 110. AR server 135 may send the customization packet, as indication 825 (FIG. 8), to CO server 130.

CO server 130 may receive the customization packet and may identify other content providers 150, that subscribe to the customization service and/or that provide advertising content to content provider 150-1. For example, CO server 130 may identify, from a list of advertising content providers 150 stored in a memory associated with CO server 130, a particular advertising content provider (e.g., content provider 150-2) that provides advertising content to content provider 150-1 and/or other content providers 150. CO server 130 may retrieve, from the memory, an IP address associated with advertising content provider 150-2.

As yet further shown in FIG. 7, process 700 may include transmitting the customization packet to the other content provider (block 725). For example, CO server 130 may use the IP address, retrieved from the memory, to transmit the customization packet, as indication 830 (FIG. 8), to advertising content provider 150-2.

Advertising content provider 150-2 may receive the customization packet and may use a key associated with a particular stage (e.g., stage 1-stage 4) to decode the network data stored within the customization packet. The key may have been obtained, at a prior point in time, when advertising content provider 150-2 subscribed to the customization service. Advertising content provider 150-2 may use the decoded network data to customize advertising content to be rendered via a web page associated with content provider 150-1.

As still further shown in FIG. 7, process 700 may include receiving a request for content associated with the content provider and transmitting to the content provider another request for the content (block 730). For example, DNS server 140 may obtain a URL from the packets associated with the DNS query. DNS server 140 may use the URL to retrieve an IP address, associated with content provider 150-1, from a memory associated with DNS server 140. DNS server 140 may transmit, in response to the DNS query, the IP address, as indication 835 (FIG. 8), to CO server 130.

CO server 130 may receive the IP address and may transmit the IP address, as indication 840 (FIG. 8) to PGW 120. PGW 120 may receive the IP address and may transmit the IP address, as indication 845 (FIG. 8), to user device 110. User device 110 may receive the IP address and may generate a request for content from content provider 150-1. In one example, the request for content may be based on a hypertext transfer protocol (HTTP) (e.g., an HTTP GET message). User device 110 may transmit the request for content, as indication 850 (FIG. 8) to PGW 120. PGW 120 may receive the request for content and may transmit another request for content, as indication 855 (FIG. 8), to CO server 130. CO server 130 may receive the other request for content and may transmit a further request for content, as indication 860 (FIG. 8), to content provider 150-1.

In another example implementation, CO server 130 may replicate packets associated with the other request for content and may transmit copies of the packets to AR server 135. The copies of the packets may include an IP address, port range, and/or information associated with user device 110 (e.g., a device identifier, such as a MDN). AR server 135 may receive the packets and may, in a manner similar to that described above in connection with FIG. 5, generate a customized packet associated with a type of content (e.g., video, audio, games, etc.) to be obtained from content provider 150-1. In one example, the customization packet may be based on a data structure (e.g., data structure 660 of FIG. 6B) that stores network content associated with preferred content titles, genres, data rates, period of time at which preferred content has been obtained by user device 110 and/or other user devices 110 within a COI, etc. AR server 135 may send the customization packet, associated with the type of content, to CO server 130. CO server 130 may send the further request for content and/or the customization packet, associated with the particular type of content, as indication 860' (FIG. 8), to content provider 150-1.

As also shown in FIG. 7, process 700 may include receiving content from the content provider based on the other request for content (block 735). For example, content provider 150-1 may receive the other request for content and may transmit the content, as indication 865 (FIG. 8), to CO server 130 in response to the other request for content. CO server 130 may receive the content from content provider 150-1.

In another example, implementation content provider 150-1 may retrieve a key that corresponds to a particular stage (e.g., stage 1-stage 4) for which content provider 150-1 has subscribed to the customization service associated with service provider network 160. Content provider 150-1 may use the key to decode network data stored within a customization packet, associated with a specific type of content (e.g., data structure 660 of FIG. 6B), that was received from CO server 130. The key may have been obtained, at a prior point in time, when content provider 150-1 subscribed to the customization service. Content provider 150-1 may use the decoded network data to customize the content to be sent to user device 110. The content may be customized based on a preferred genre, preferred content titles, etc. The content may be transmitted, to user device 110, at a data rate identified within the network data. Content provider 150-1 may send the customized content, as indication 865' (FIG. 8) to CO server 130. CO server 130 may receive the customized content from content provider 150-1.

As further shown in FIG. 7, process 700 may include receiving customized advertising content from the other content provider based on the customization packet (block 740). For example, advertising content provider 150-2 may send customized advertising content, that was generated using the network data obtained from the customization packet, as indication 870 (FIG. 8), to CO server 130. Advertising content provider 150-2 may, in one example, transmit the customized advertising content in response to a request from content provider 150-1. Advertising content provider 150-2 may, in another example, transmit the customized advertising content in response to a request from CO server 130 (e.g., based on scripts that are executed within the content received from content provider 150-1).

CO server 130 may receive the customized advertising content and may transmit the customized advertising content and/or the content (e.g., received from content provider 150-1), as indication 875 (FIG. 8), to PGW 120. PGW 120 may receive the customized advertising content and/or the content and may transmit the customized advertising content and/or the content, as indication 880 (FIG. 8), to user device 110. User device 110 may receive the customized advertising content and/or the content and may render the customized advertising content and/or the content for display on user device 110. In another example implementation, user device 110 may receive the customized content from CO server 130 (e.g., via PGW 120) and may render the customized content for display on user device 110.

Systems and/or methods, described herein, may enable network data, associated with a user device, to be encoded and/or stored within a customization packet that, when decoded, permits a content provider to send customized content to a user device. The systems and/or methods may transmit the customization packet to the content provider and/or an advertising content provider. The systems and/or methods may transmit the customization packet in a timely manner that enables customized advertising content to be dynamically generated and/or rendered via a webpage associated with the content provider.

The foregoing description provides illustration and description, but is not intended to be exhaustive or to limit the implementations to the precise form disclosed. Modifications and variations are possible in light of the above teachings or may be acquired from practice of the embodiments.

While series of blocks have been described with regard to FIGS. 5 and 7, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set. No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The term packet, as used herein, may refer to a datagram, a data item, or a cell; a fragment of a packet, a fragment of a datagram, a fragment of a data item, a fragment of a cell; or another type, arrangement, or packaging of data.

What is claimed is:

1. A non-transitory computer-readable medium containing one or more instructions that, when executed by a processor, cause the processor to perform the steps of:
   associating content providers with other content providers;
   storing, in a memory, the associated content provider information;
   receiving network data associated with a user device;
   storing, in the memory, the received network data associated with the user device;
   receiving, from the user device, a request for an Internet protocol (IP) address associated with a first content provider;
   determining that the request for the IP address was received;
   transmitting, based on a determination that the request for the IP address was received, the IP address to the user device;
   retrieving, from the memory, the network data associated with the user device;
   generating a customization packet associated with the user device based on the retrieved network data associated with the user device, wherein generating the customization packet includes:
      associating groups of fields with the generated customization packet;
      encoding each of one or more portions of the retrieved network data using a respective different key, of one or more keys, and
      storing each of the one or more encoded portions in a respective different group of fields, of one or more groups of fields associated with the customization packet;
   transmitting the generated customization packet to a second content provider that is associated with the first content provider, wherein transmitting the customization packet permits the second content provider to provide customized content, to the user device, based on which, of the one or more groups of fields, the second content provider is authorized to access;
   receiving, from the user device, a request for content based on the transmitted IP address;
   determining, that the request for the content was received from the user device;
   receiving, based on a determination that the request for the content was received from the user device, the content from the first content provider using the IP address;
   receiving the customized content from the second content provider; and
   transmitting the received content or the received customized content to the user device.

2. The non-transitory computer-readable medium of claim 1, wherein the step of receiving the request for the IP address includes the steps of:
   transmitting a packet, associated with the request, to a domain name service (DNS) server associated with a service provider network, wherein transmitting the packet to the DNS server enables the DNS server to identify the IP address, associated with the first content provider, based on a uniform resource locator (URL) obtained from the packet; and
   receiving, from the DNS server, the IP address associated with the first content provider.

3. The non-transitory computer-readable medium of claim 1, further comprising a step of identifying the user device associated with the request for the IP address, including:
   receiving, information associated with network address (NAT) bindings, including information associated with the user device based on an internal address or one or more port identifiers, associated with the internal address, obtained from a packet associated with the request for the IP address.

4. The non-transitory computer-readable medium of claim 3, wherein step of generating the customization packet associated with the user device includes the steps of:
   generating a copy of the packet associated with the request;
   transmitting, to a server device, the copy of the packet and the information associated with the user device, wherein transmitting the copy of the packet and the information associated with the user device enables the server device to:
      retrieve the network data, associated with the user device, and
      generate the customization packet using the retrieved network data; and
   receiving the customization packet from the server device.

5. The non-transitory computer-readable medium of claim 4, wherein step of generating the customization packet associated with the user device further includes the steps of:
   receiving, from the server device, an indication that a condition, associated with the copy of the packet, was detected by the server device, and
   transmitting, to the user device, a notification denying the request for the IP address.

6. The non-transitory computer-readable medium of claim 1, wherein the network data, associated with the user device, includes at least one of:
   information associated with a location of the user device,
   information associated with a user of the user device,
   information associated with a usage history of the user device, or
   information associated with a community of interest of the user device, the information associated with the community of interest, including other information associated with a usage history for one or more preferred user devices with which the user device communicates.

7. The non-transitory computer-readable medium of claim 1, wherein the step of receiving the request for the content includes:
   obtaining, from a server device, another customization packet associated with the user device, wherein the other customization packet stores other network data associated with the user device, wherein the other network data includes at least one of:
      a list of identifiers that correspond to content previously obtained by the user device,
      information associated with one or more genres associated with the content that was previously obtained by the user device, or
      information associated with one or more data rates that correspond to a manner in which the content is to be transmitted to the user device.

8. The non-transitory computer-readable medium of claim 1, wherein the step of transmitting the generated customization packet to the second content provider includes:

identifying a level of access to the network data, stored within the customization packet, that has been granted to the second content provider, and transmitting, to the second content provider, a key that corresponds to the identified level of access to the network data, wherein the step of transmitting the key to the second content provider permits the second content provider to access a portion of the network data that corresponds to the identified level of access.

9. A system, associated with a service provider network, comprising:

one or more device processors:

a non-transitory memory containing instructions, when executed by the one more device processors, cause the one or more device processors to perform the steps of:

associating content providers with other content providers;

storing, in a memory, the associated content provider information;

receiving network data associated with a user device;

storing, in the memory, the received network data associated with the user device;

receiving, from the user device, a request for an Internet protocol (IP) address associated with a first content provider;

determining that the request for the IP address was received;

transmitting, based on a determination that the request for the IP address was received, the IP address to the user device;

retrieving, from the memory, network data associated with the user device;

generating a customization packet, associated with the user device based on the retrieved network data associated with the user device, wherein generating the customization packet includes:

associating groups of fields with the generated customization packet, encoding each of one or more portions of the retrieved network data using a respective different key, of one or more keys, and storing each of the one or more encoded portions in a respective different group of fields, of one or more groups of fields associated with the customization packet;

transmitting the generated customization packet to a second content provider that is associated with the first content provider, wherein transmitting the customization packet permits the second content provider to provide customized content, to the user device, based on which, of the one or more groups of fields, the second content provider is authorized to access;

receiving, from the user device, a request for content based on the transmitted IP address;

determining that the request for the content was received from the user device;

receiving, based on a determination that the request from the user device for the content was received, the content from the first content provider using the IP address;

receiving the customized content from the second content provider; and transmitting the received content or the received customized content to the user device.

10. The system of claim 9, wherein the instructions further cause the one or more device processors to perform the steps of:

identifying at least one group of fields, of the one or more groups of fields, that the second content provider is authorized to access, and sending, to the second content provider, at least one key, of the one or more keys, that corresponds to the at least one group of fields, wherein sending the at least one key to the second content provider enables the second content provider to:

obtain at least one portion, of the one or more portions of the network data, from the at least one group of fields within the customization packet, and generate the customized content based on the at least one portion.

11. The system of claim 9, wherein the stored network data associated with the user device includes:

a usage history of the user device, a location of the user device, and a user of the user device.

12. The system of claim 11, wherein the retrieved network data includes:

the usage history of the user device, the location of the user device, or the user of the user device.

13. A method comprising:

associating, by a domain name service (DNS) server, content providers with other content providers;

storing, in a memory by the DNS server, the associated content provider information;

receiving, by the DNS server, network data associated with a user device;

storing, in the memory by the DNS server, the received network data associated with the user device;

receiving, from the user device, a request for an Internet protocol (IP) address associated with a first content provider;

determining that the request for the IP address was received;

transmitting, by the DNS server based on a determination that the request for the IP address was received, the IP address to the user device;

retrieving, by the DNS server, from a memory, the network data associated with the user device;

generating, by the DNS server, a customization packet, associated with the user device based on the retrieved network data associated with the user device, wherein generating the customization packet includes:

associating, by the DNS server, groups of fields with the generated customization packet, encoding, by the DNS server, each of one or more portions of the retrieved network data using a respective different key, of one or more keys, and storing, by the DNS server, each of the one or more encoded portions in a respective different group of fields, of one or more groups of fields associated with the customization packet;

transmitting, by the DNS server, the generated customization packet to a second content provider that is associated with the first content provider, wherein transmitting the customization packet permits the second content provider to provide customized content, to the user device, based on which, of the one or more groups of fields, the second content provider is authorized to access;

receiving, by the DNS server and from the user device, a request for content based on the transmitted IP address;

determining, by the DNS server, that the request for the content was received from the user device;

receiving, based on a determination that the request for the content was received from the user device, the content from the first content provider using the IP address;

receiving, by the DNS server, the customized content from the second content provider; and transmitting, by the DNS server, the received content or the received customized content to the user device.

14. The method of claim 13, wherein receiving the request for the IP address associated with the content provider includes:

transmitting a packet, associated with the request for the IP address, to the DNS server associated with the service provider network, wherein transmitting the packet to the DNS server enables the DNS server to identify the IP address, associated with the first content provider, based on a uniform resource locator (URL) obtained from the packet; and receiving, from the DNS server, the IP address associated with the first content provider.

15. The method of claim 13, wherein identifying the user device associated with the request for the IP address includes:

obtaining, from information associated with network address translation (NAT) bindings, information associated with the user device based on an internal address or one or more port identifiers, associated with the internal address, obtained from the packet associated with the request for the IP address.

16. The method of claim 15, wherein generating the customization packet associated with the user device further includes:

generating a copy of the packet associated with the request for the IP address;

transmitting, to a server device, the copy of the packet and the information associated with the user device, wherein transmitting the copy of the packet and the information associated with the user device enables the server device to:

retrieve the network data, associated with the user device, and generate the customization packet using the retrieved network data; and receiving the customization packet from the server device.

17. The method of claim 16, wherein generating the customization packet associated with the user device further includes:

receiving, from the server device, an indication that a condition, associated with the copy of the packet, was detected by the server device, and transmitting, to the user device, a notification denying the request for the IP address.

18. The method of claim 13, wherein the network data, associated with the user device, includes at least one of:

information associated with a location of the user device, information associated with a user of the user device, information associated with a usage history of the user device, or information associated with a community of interest of the user device, the information associated with the community of interest including other information associated with a usage history for one or more preferred user devices with which the user device communicates.

19. The method of claim 13, wherein receiving the request for the content includes:

obtaining, from the server device, another customization packet associated with the user device, wherein the other customization packet stores other network data associated with the user device, wherein the other network data includes at least one of:

a list of identifiers that correspond to content previously obtained by the user device, information associated with one or more genres associated with the content that was previously obtained by the user device, or information associated with one or more data rates that correspond to a manner in which the content is to be transmitted to the user device.

20. The method of claim 13, wherein transmitting the customization packet to the second content provider includes:

identifying a level of access to the network data, stored within the customization packet, that has been granted to the second content provider, and transmitting, to the second content provider, a key that corresponds to the identified level of access to the network data, wherein transmitting the key to the second content provider permits the second content provider to access a portion of the network data that corresponds to the identified level of access.

* * * * *